United States Patent [19]

Watson

[11] Patent Number: 4,887,127
[45] Date of Patent: Dec. 12, 1989

[54] NEGATIVE CARRIER ASSEMBLY FOR OMEGA ENLARGERS

[76] Inventor: Robert B. Watson, 7720 E. Pierce Pl., Tucson, Ariz. 85710

[21] Appl. No.: 16,757

[22] Filed: Feb. 19, 1987

[51] Int. Cl.$^4$ ............................................. G03B 27/62
[52] U.S. Cl. ................................................. 355/75
[58] Field of Search ............................ 355/71, 75, 76

[56] References Cited

U.S. PATENT DOCUMENTS

| 2,236,303 | 3/1941 | Skinner et al. | 355/75 X |
| 2,294,585 | 9/1942 | Thompson | 355/75 X |
| 2,390,065 | 12/1945 | Gelb | 355/76 |
| 2,455,142 | 11/1948 | Simmon et al. | 355/75 X |
| 3,734,615 | 5/1973 | Wally, Jr. | 355/76 |
| 4,334,768 | 6/1982 | Parik | 355/75 |

*Primary Examiner*—Richard A. Wintercorn

[57] ABSTRACT

Several improvements to Omega negative carrier assemblys baffle the optical light path against light leaks.

These improvements collectively gather together to form a system that continually assures the alignment of the condenser assembly and its lifting apparatus. This system will allow serviceable alignment of the lifting apparatus when necessary.

This negative carrier assembly will be completely manufactured by computerized machine tool methods.

2 Claims, 2 Drawing Sheets

NEGATIVE CARRIER ASSEMBLY FOR OMEGA ENLARGERS

BACKGROUND OF THE INVENTION

1. Field of the Invention

This patent application relates to the improvements upon negative carrier assemblys used by photographic enlargers manufactured under the Omega name.

2. Description of the Prior Art

The present negative carrier assemblys have been manufactured in the same form since the year 1939. The negative carrier assembly is composed of a sandwich of 2 planar pieces of metal, aligned to each other by 4 pins. Light frequently escapes the optical light path. There is no positive provision for baffling the light escaping the optical light path. This light can falsely expose light sensitive materials and/or adversely effect measurements for the same. Later models of the negative carrier assembly have a boss attached to the bottom of the carrier that partially baffles light escaping the optical light path. This boss is attached by screws that frequently loosen with the loss of any light baffling. This boss is also used to assure alignment, on later models of the enlarger, of the negative carrier assembly and negative during exposure and printing.

Alignment of the condenser lens assembly shifts with use. This shifting necessitates frequent alignment which is usually ignored as long as possible because of inconvenience, costs, and difficulty in locating sufficiently skilled photo equipment technicians.

The present negative carrier assemblys are formed by punching which necessitates separate tooling for each size negative carrier assembly. Punching inherently deforms and stresses the metal resulting in negative carrier assemblys which are not sufficiently flat to insure results which are expected for todays' photographic state of art.

SUMMARY OF THE INVENTION

The invention relates to several improvements of the past and present negative carrier assemblys as used with Omega enlargers.

It is the object of this invention to provide an improved negative carrier assembly which will secure the photographic enlarging process against unwanted light loss from the optical light path through light leaks about the negative carrier assembly.

It is also an object of this invention to provide continuing assurance of the alignment of the condensed assembly and its lifting apparatus, and reestablishment of the same.

An additional object of this invention is to manufacture a negative carrier with sufficient precision to assure continued precise alignment of the enlarger.

DESCRIPTION OF THE PREFERRED EMBODIMENT

Figure 1:
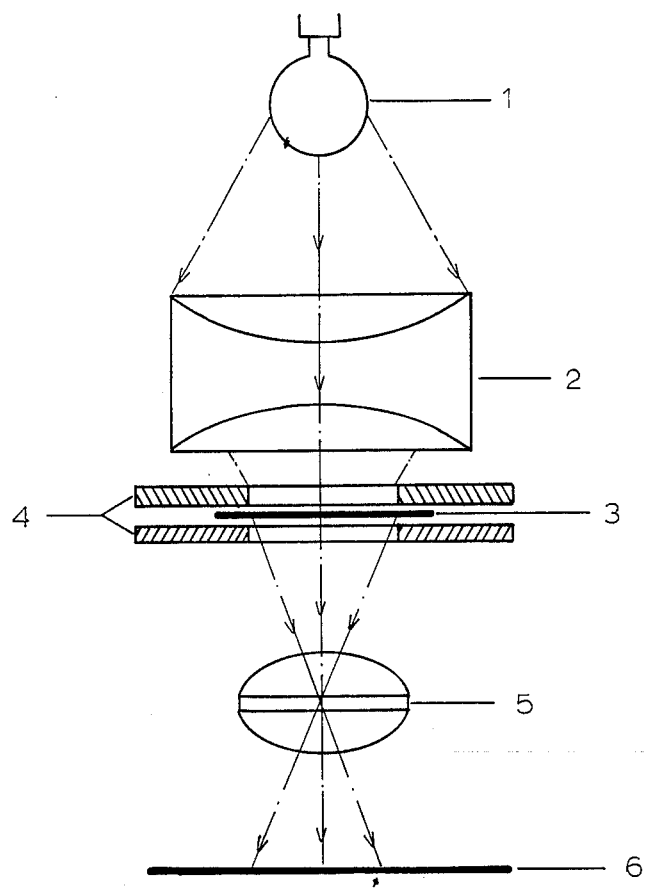
FIG. 1 ia a cross section of the embodiment of the optical path.

FIG. 1 The optical light path in the Omega enlarger is from the light source 1 through a condenser assembly 2 through the negative 3 in the negative carrier assembly 4 and into the enlarger lens 5 where it is dispersed and focused to the light sensitive material 6 for exposure.

Figure 2:
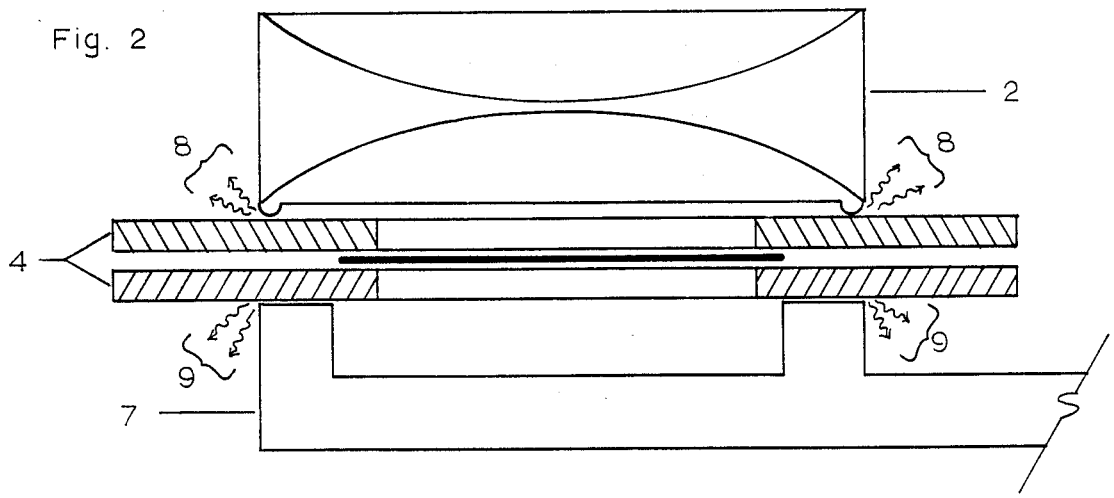
FIG. 2 is a cross section view depicting the embodiment of the present negative assembly showing the detail of the optical light path as it passes through the present negative carrier assembly.

FIG. 2 During use where the condenser assembly 2 mates with the negative carrier assembly 4 and where the negative carrier 4 mates with the negative support stage 7, light leaks 8,9 from the optical light path are present from the beginning of use of both the enlarger and any negative carrier assemblies 4.

Figure 3:
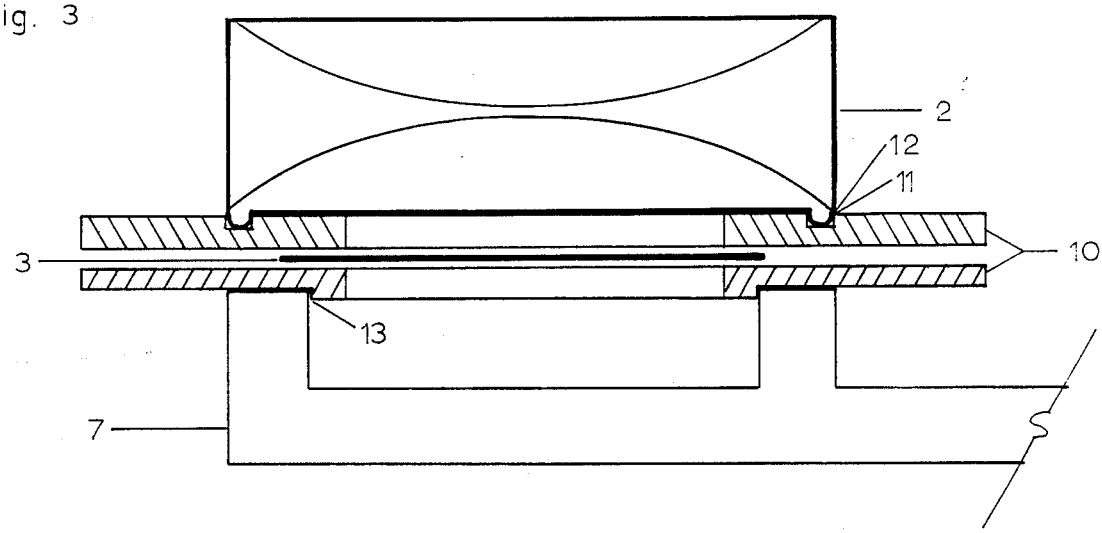
FIG. 3 is a cross section view of the embodiment of the improved negative carrier assembly showing in detail the baffling to prvent light escaping the optical light path.

FIG. 3 My negative carrier assembly 10 utilizes a groove 11 to engage the condenser lens assembly 2 about its lower circumference 12. This groove 11 is dimensioned to closely engage the lower circumferential portion 12 of the condenser lens assembly 2. This groove 11 in concert with the lower circumferential portion 12 of the condenser lens assembly 2 will baffle the light leak 8. Additionally my negative carrier assembly 10 has integral boss 13 on the bottom of the negative carrier assembly 10 which will baffle the light leak 9. This boss 13 engages also engages the negative stage support 7 to assure proper negative 3 alignment during exposure.

Figure 4:
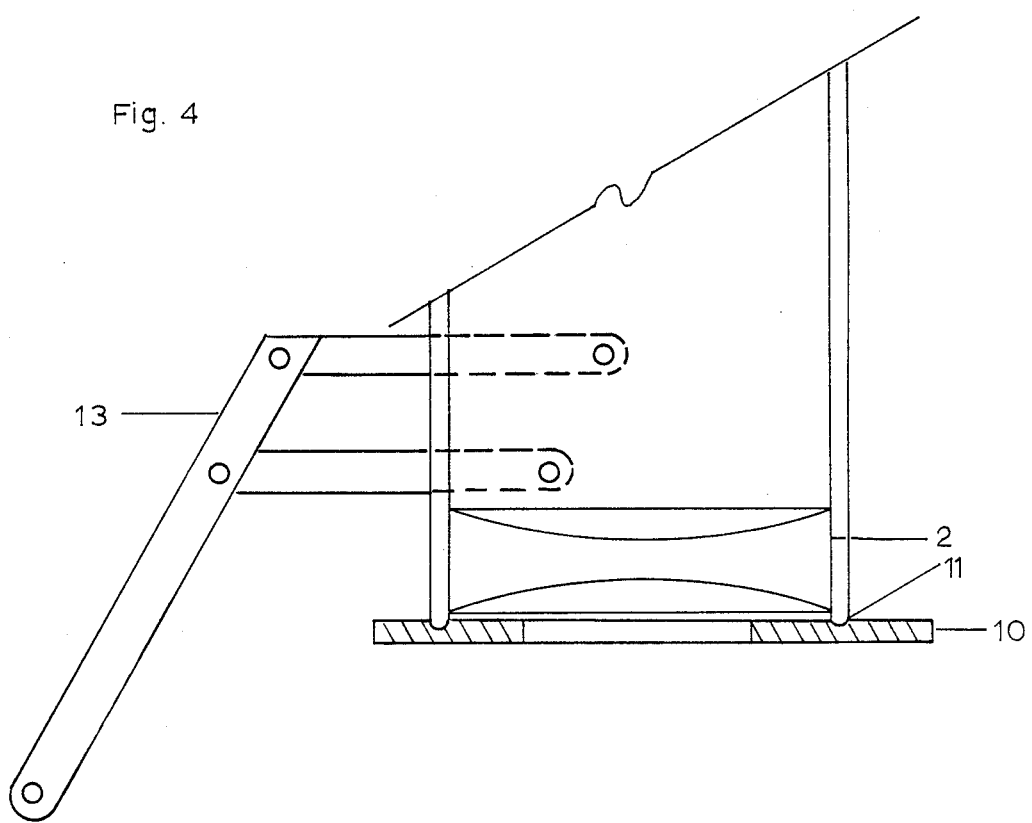
FIG. 4 is a cross section view of the lifting apparatus for the condenser assembly.

FIG. 4 The groove 11 on top of the negative carrier assembly 10 being closely engaged with the condenser lens assembly 2 will continously assure the alignment of the condenser lens assembly 2 and its lifting apparatus 13.

I claim:

1. An upper light baffle on the top of an enlarger negative carrier assembly comprising, a groove formed in the top surface of said negative carrier, a condenser lens assembly having a lower protruding circumferential portion engaging said groove, whereby light transmitted along the optical path of the enlarger is prohibited from escaping said path thereby improperly exposing light sensitive material and/or adversely effecting exposure measurements.

2. A lower light baffle on the bottom of an enlarger negative carrier assembly comprising, a boss integrally formed on the lower surface of said negative carrier assembly, a negative stage support having means engaging said boss, whereby proper negative alignment during exposure is assured and light which would improperly expose light sensitive materials and/or adversely effect exposure measurements is prohibited from escaping from marginal portions of the negative carrier.

* * * * *